US007184255B2

(12) United States Patent
Chen

(10) Patent No.: US 7,184,255 B2
(45) Date of Patent: Feb. 27, 2007

(54) FLOOR MAT FOR COLLECTING PROCESS PARTICLES AND GROUNDING THE ELECTROSTATIC CHARGE

(76) Inventor: Ching-Lung Chen, No. 10, Alley 16, Lane 167, Ta Tung Road, Chu Tung Chen, Hsinchu Hsien (TW)

(*) Notice: Subject to any disclaimer, the term of this patent is extended or adjusted under 35 U.S.C. 154(b) by 338 days.

(21) Appl. No.: 10/345,963

(22) Filed: Jan. 17, 2003

(65) Prior Publication Data

US 2004/0012908 A1 Jan. 22, 2004

(30) Foreign Application Priority Data

Jul. 19, 2002 (TW) .............................. 91116188 A

(51) Int. Cl.
*H02H 1/00* (2006.01)

(52) U.S. Cl. ...................................... 361/220; 361/212

(58) Field of Classification Search ........ 361/212–224; 15/225

See application file for complete search history.

(56) References Cited

U.S. PATENT DOCUMENTS 2,895,159 A * 7/1959 Ostrow ........................ 15/311
3,786,531 A * 1/1974 Borg ........................... 15/310
3,808,628 A * 5/1974 Betts ........................... 15/215
4,143,194 A * 3/1979 Wihksne ....................... 428/81
4,430,645 A * 2/1984 Eskandry et al. ........ 340/572.2
5,317,476 A * 5/1994 Wallace et al. ............. 361/220
5,970,556 A * 10/1999 Nemoto ....................... 15/1.51
6,477,027 B1 * 11/2002 McKelvy .................... 361/220
6,578,324 B2 * 6/2003 Kessler et al. ................ 52/177

* cited by examiner

*Primary Examiner*—Brian Sircus
*Assistant Examiner*—Danny Nguyen
(74) *Attorney, Agent, or Firm*—Quintero Law Office

(57) ABSTRACT

A conductive floor mat is disclosed for collecting process particles and grounding the electrostatic charge accumulated on operators who stand on the mat. The conductive floor mat includes a frame assembly, a plurality of parallel spaced ribs, a plurality of parallel spaced supports and grounding wires. The frame assembly includes four frame members and a bottom surface. At least one of the four frame members has an angled top surface. Both ends of the ribs and supports are mounted to the opposite of the frame members. The supports are perpendicularly fixed to the ribs for increasing the supporting capacity thereon. The grounding wires are extending from the frame assembly to discharge the electrostatic charge accumulated on the operators.

8 Claims, 4 Drawing Sheets

FLOOR MAT FOR COLLECTING PROCESS PARTICLES AND GROUNDING THE ELECTROSTATIC CHARGE

FIELD OF THE INVENTION

The present invention relates to a conductive floor mat and, more particularly, to a mat for collecting process particles produced from processes and grounding the electrostatic charge accumulated on operators standing on the mat.

BACKGROUND OF THE INVENTION

With the growth of information products such as notebooks, monitors, cell phones and personal digital assistants (PDAs), the requiring quantities of panels increase dramatically. It's estimated that optoelectronic industry will become an important and potential industry after semiconductor development.

LCD manufacture is divided into three processes: (1) array process; (2) panel process; and (3) module process. The array process is mainly comprised of forming a plurality of transistors on a first glass substrate by using steps similar to those of fabricating a semiconductor device. These steps include plating, exposure, development and etching etc. The first glass substrate with the transistors being fabricated thereon is defined as a transistor substrate. A black matrix and red, green, and blue color filters are then deposited and patterned on a second glass substrate to form a color filter substrate. The panel process is coating a polyimide material on the transistor substrate and the color filter substrate individually. Then the transistor substrate and the color filter substrate are joined with an adhesive seal material. Before sealing the two substrates, spacers are deposited to maintain a precise gap between two surfaces of the substrates. The substrates are aligned and laminated using heat and pressure. Liquid crystal material is then injected into the small space between the substrates. Next, polarizers are attached to outsides of the transistor substrate and the color filter substrate for forming a display cell. The cell is then cut to optimal-sized panels. The module process is assembling the panel, driver ICs, circuit boards, a backlight unit and a plastic cover to create a liquid crystal display module (LCM).

In the panel process, the cutting step of the substrates is performed in a scribing station. Please refer to FIG. 1. This figure shows a top plan view of the scribing station arrangement. The scribing station indicated at 30 is usually a dust-free room. When the substrate assembly (not shown herein) is delivered to the scribing station 30, an operator 38 who stands in an operating area 36 uses a breaking machine 32 or a scribing machine 34 to cut the substrate assembly.

It's noted that the operator 38 generally put on a conductive clothes, conductive gloves, conductive shoes and a wrist strap to drain electrostatic charge accumulated on the operator 38 for preventing LCD devices from being seriously damaged by the electrostatic charge. However, glass particles produced from the process of glass substrate scribing fall onto the raised floor. This result leads to the operator 38 directly step on the glass particles and the electrostatic discharge ability of the conductive shoes is obviously lowered.

Fragile electronic components, such as integrated circuits, and other components frequently mounted on circuit boards are readily susceptible and damaged due to the electrostatic charge accumulated on the operator. At the time this occurs, if the operator 38 is charged with high voltage of electrostatic charge and if the electrical component is susceptible to be damaged from such high voltage, the electronic components may be completely or partially impaired, even though very little current passes through the device.

Based on the above descriptions, how to solve these problems is becoming an important and essential subject in the optoelectronic field.

SUMMARY OF THE INVENTION

The first objective of the present invention is to provide a conductive floor mat used for collecting process particles.

The second objective of the present invention is to provide a conductive floor mat used for grounding the electrostatic charge accumulated on the operator who stands on the mat.

The third objective of the present invention is to provide a conductive floor mat which is of simple construction, which achieves the stated objectives in a simple, effective and inexpensive manner and which solves problems and satisfies needs existing in the art.

The invention provides a conductive floor mat disposed on a raised floor for collecting process particles and grounding the electrostatic charge accumulated on the operator to a ground end. The conductive floor mat includes a frame assembly, a plurality of parallel spaced ribs, a plurality of parallel spaced supports and grounding wires. The frame assembly is comprised of four frame members and a bottom surface, in which at least one of the frame members has a ramped top surface to prevent operators from tripping when stepping from the raised floor onto the conductive floor mat. Both ends of the parallel spaced ribs and the supports are mounted to opposite frame members. The supports are perpendicularly fixed to the ribs for increasing the supporting capacity of the ribs. The grounding wires are extended from the frame assembly to ground the electrostatic charge.

BRIEF DESCRIPTION OF THE DRAWINGS

The foregoing aspects and many of the attendant advantages of this invention will become more readily appreciated and understood by referencing the following detailed description in conjunction with the accompanying drawings, wherein.

DETAILED DESCRIPTION OF THE PERFERRED EMBODIMENTS

In order to solve the problems described in the background, this invention discloses a conductive floor mat for collecting process particles. More particularly, the invention discloses a conductive floor mat which has grounding wires for discharging the electrostatic charge accumulated on operators to a ground end. In this present invention, the conductive floor mat is disposed on a raised floor of a scribing station. However, it won't be restricted to the concept of the invention. The conductive floor mat is detailed described below.

Figure 1:
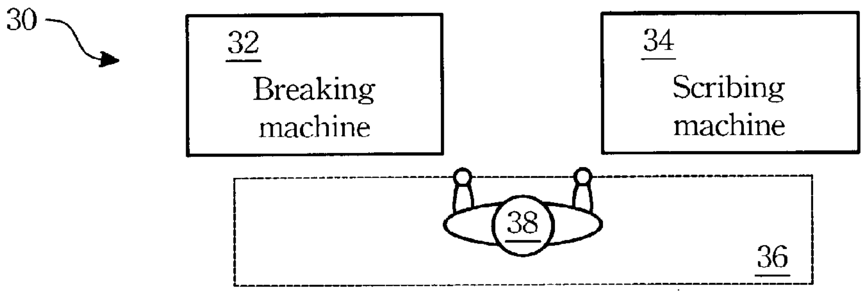
F I G . 1 (Prior Art)
FIG. 1 is a top plan view of the scribing station arrangement.
Figure 2:
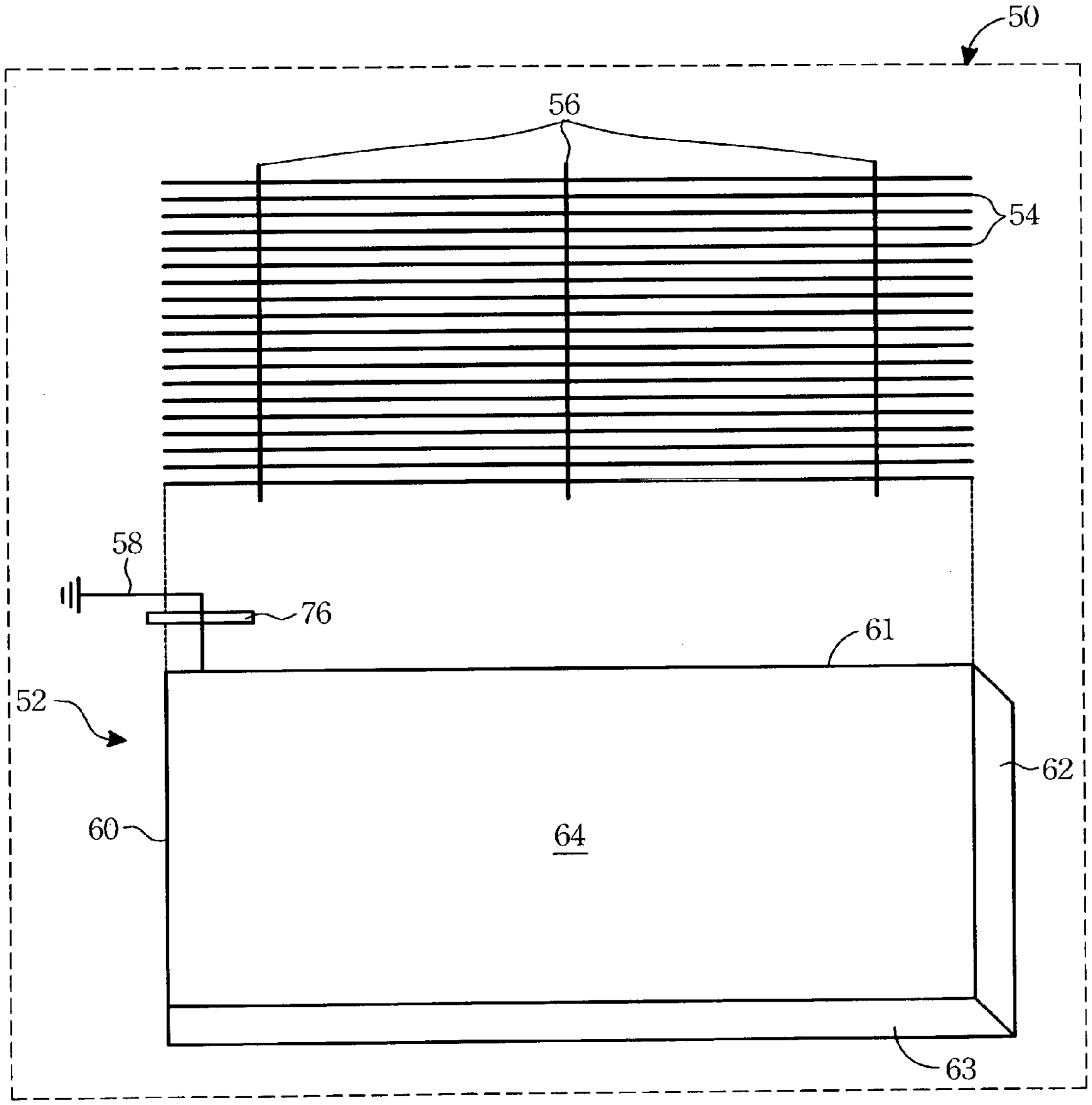
FIG. 2 is a top plan view of the conductive floor mat, illustrating the compositions of the conductive floor mat in accordance with the present invention.
Figure 3:
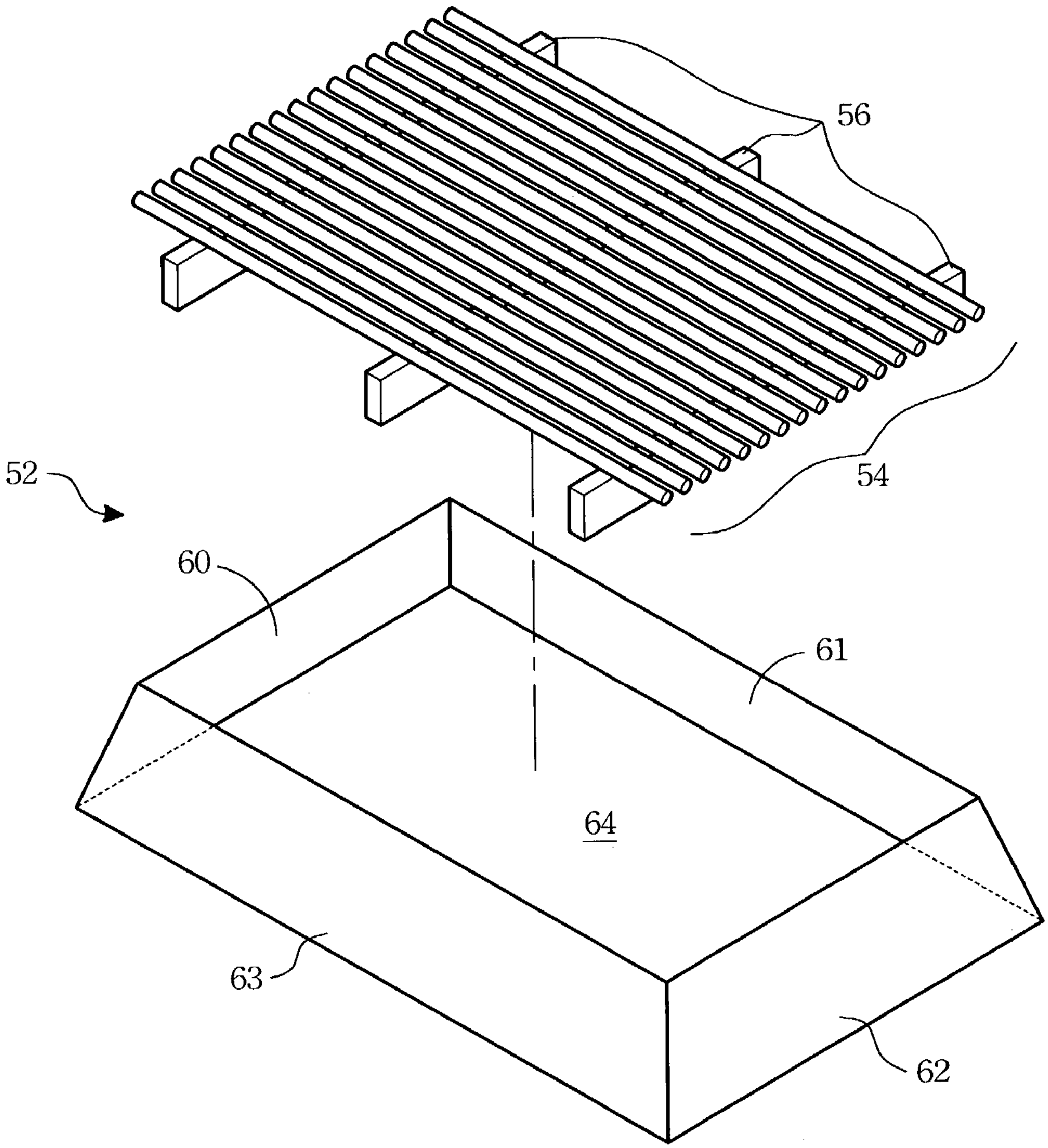
FIG. 3 is an exploded perspective view of the conductive floor mat, illustrating the compositions of the conductive floor mat in accordance with the present invention.
Figure 4:
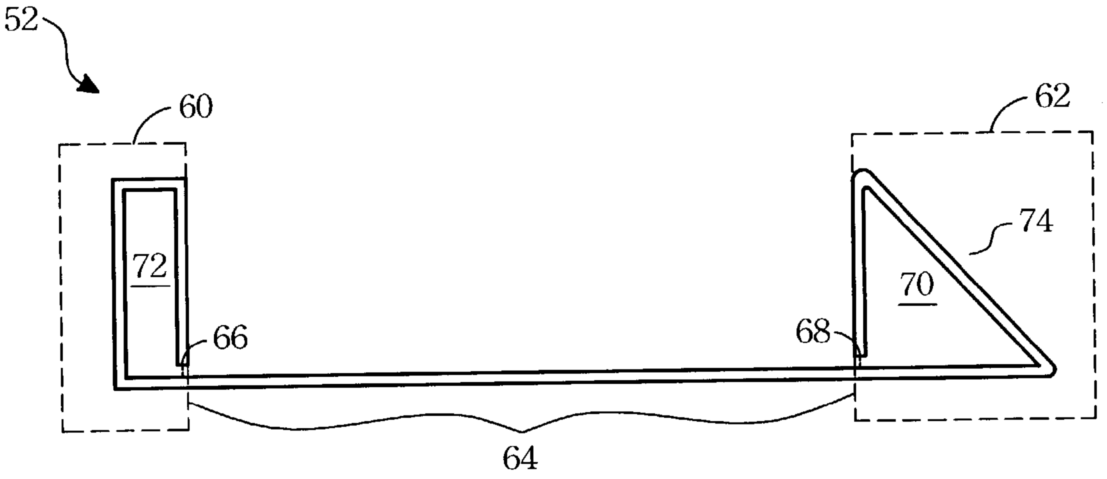
FIG. 4 is a cross-sectional view of the conductive floor mat, illustrating the frame members and the bottom surface can be made of a metal board in accordance with the present invention.

Please refer to FIG. 2 and FIG. 3. The conductive floor mat 50 includes a frame assembly 52, a plurality of parallel spaced ribs 54, a plurality of parallel spaced supports 56, grounding wires 58 (not shown in FIG. 3) and a fixing button 76 (not shown in FIG. 3). In this present invention, the frame assembly 52 includes a first frame member 60, a second frame member 61, a third frame member 62, a fourth frame member 63 and a bottom surface 64. At least one of the four frame members has a ramped top surface in order to prevent operators from tripping when stepping from the raised floor onto the conductive floor mat 50. In one preferred embodiment, the third frame member 62 and the fourth frame member 63 have angled top surfaces. Besides, the four frame members and the bottom surface 64 are made of an identical metal board. The metal board is cut and pressed to the structure of FIG. 4 (which is a cross-sectional view of the frame assembly 52 showed in FIG. 2). Subsequently, a first end 66 and a second end 68 indicated in FIG. 4 are welding to the portion of the metal board which is served as the bottom surface 64 to form the structure of FIG. 5. The frame assembly 52 is preferably made of a dust-free material such as a stainless steel, in which the thickness thereof is between 0.04 to 0.06 inches. Still referring to FIG. 3, the supports 56 sustain the ribs 54 to position above the bottom surface 64 of the frame assembly 52.

Figure 5:
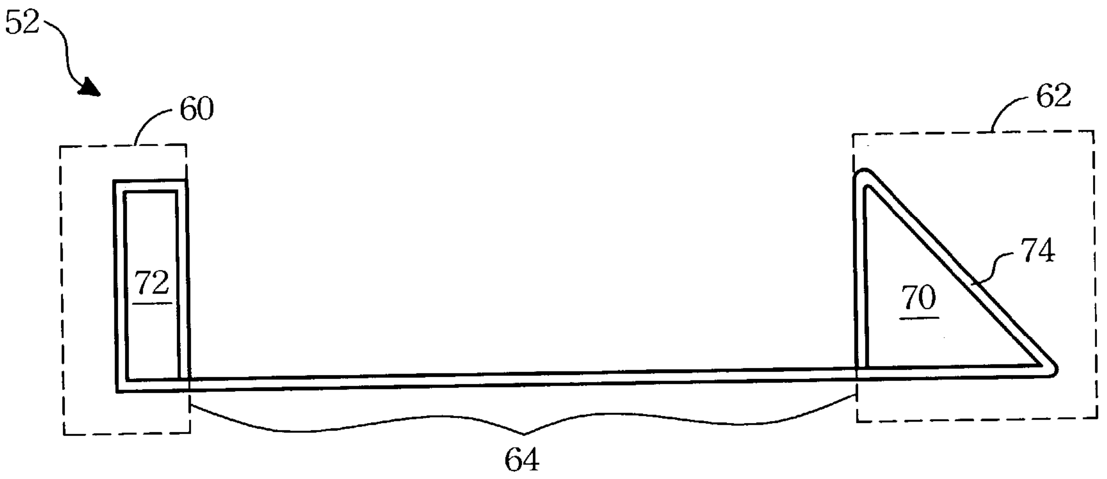
FIG. 5 is a cross-sectional view of the frame assembly of the present invention.

Please refer to FIG. 5, in which the third frame member 62 has an angled top surface 74 to prevent operators from tripping when stepping from the raised floor onto the conductive floor mat. The third frame member 62 has a triangular-shaped sealed area 70 and the first frame member 60 has a rectangular-shaped sealed area 72 in cross-section. The angle between the top surface 74 and bottom surface of the third frame member 62 is 30 to 45 degrees. In a preferred embodiment, the frame assembly 52 is about 3.8 foot-by 1.7 foot and the height thereof is 0.1 foot. The angle between the top surface 74 and bottom surface of the third frame member 62 is 45 degree. However, these descriptions won't be restricted to the concept of the invention.

Figure 6:
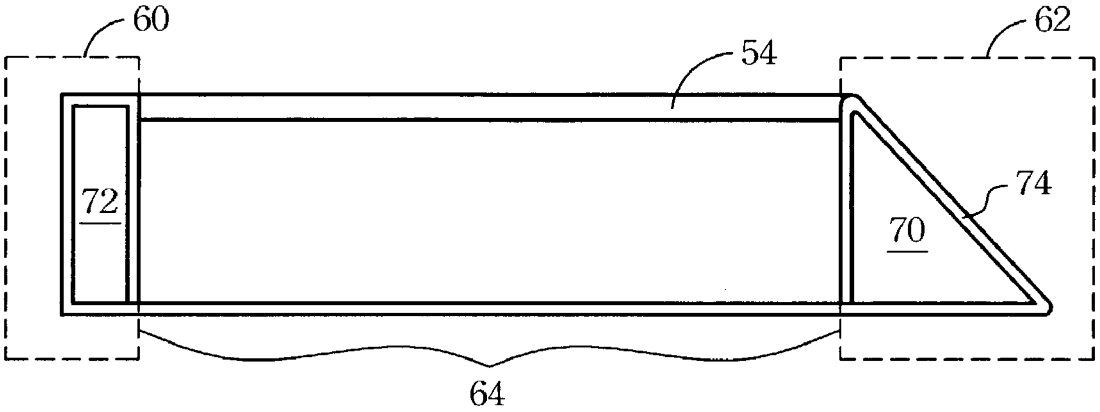
FIG. 6 is a cross-sectional view of the combination of the frame assembly and the ribs.

Please refer to FIG. 6. This figure illustrates the combination of the frame assembly 52 and the parallel spaced ribs 54 in a cross-sectional view. Both ends of the ribs 54 are mounted to the first frame member 60 and the third frame member 62. In one embodiment of the present invention, the ribs 54 are comprised of hollow cylinders with a diameter of 0.2 to 0.4 inches. The ribs 54 can be made of a dust-free material, such as a stainless steel or any the like. The supporting capacity upon the ribs 54 is about 220 to 330 pounds per square inch and the ribs 54 are spaced apart from one other by a distance of 1 to 2 inches. In addition, the ribs 54 are mounted to the first frame member 60 and the third frame member 62 by the method of welding. Notedly, these descriptions won't be confined to the concept of the present invention.

Figure 7:
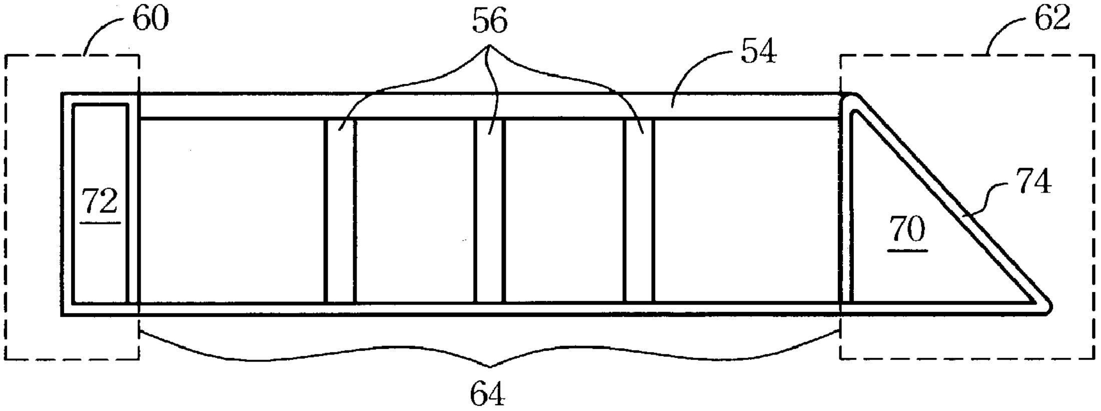
FIG. 7 is a cross-sectional view of the combination of the frame assembly, the ribs and the supports.

Please refer to FIG. 7. This figure illustrates the combination of the frame assembly 52, the ribs 54 and the supports 56 in cross-section. Both ends of the parallel spaced supports 56 are mounted to the second frame member 61 and the fourth frame member 63 (not shown herein). The supports 56 are perpendicularly fixed to the ribs 54 to increase the supporting capacity upon the ribs 54, and to avoid noise produced from the collision between the ribs 54 and the supports 56. In a preferred embodiment, the supports 56 and the ribs 54 are welded together.

Please refer back to the FIG. 2. When operators standing on the conductive floor mat 50 and being charged with the electrostatic charge, the grounding wires 58 extending from the frame assembly 52 are used to discharge the electrostatic charge accumulated on operators. The conductive floor mat 50 further includes a fixing button 76 installed on the frame assembly 52. The fixing button 76 is used for combining and fastening two of the frame assemblies 52. In one preferred embodiment, the grounding wires 58 extending from the frame assembly 52 and passing through a hole fabricated in the fixing button 76 are connecting to a ground end (not shown herein) for discharging the static electricity accumulated on operators.

The conductive floor mat 50 is then disposed on a mat (not shown herein) for increasing the friction between the conductive floor mat 50 and the mat so as to prevent the conductive mat 50 from sliding onto the raised floor.

Accordingly, the conductive floor mat described above has a good collecting function of process particles. The particles falling on the bottom surface of the frame assembly can be easily removed by a vacuum cleaner's cleaning head.

Furthermore, the grounding wires extending from the frame assembly are used to drain the electrostatic charge accumulated on the operator so that important electronic components mounted on the circuit board won't be damaged by the electrostatic charge.

While the preferred embodiment of the invention has been illustrated and described, it is appreciated that various changes can be made therein without departing from the spirit and scope of the invention.

What is claimed:

1. A conductive floor mat disposed on an upper surface of a floor for collecting process particles and grounding an electrostatic charge, which comprises:

a conductive frame assembly disposed on the upper surface of the floor, the conductive frame assembly including four frame members and a bottom surface, in which at least one of the four frame members has an angled top surface;

a top surface comprising a plurality of parallel spaced conductive ribs in which both ends of the conductive ribs are mounted to opposite sides of the conductive frame assembly; and grounding wires extending from the frame assembly for discharging the electrostatic charge, wherein two of the frame members comprise hollow areas, and said two frame members are oppositely disposed, and the conductive ribs are connected between said two frame members.

2. The conductive floor mat of claim 1, wherein the top surface consists essentially of the plurality of parallel spaced conductive ribs.

3. The conductive floor mat of claim 1, wherein the hollow areas are sealed.

4. A conductive floor mat for collecting process particles and grounding electrostatic charge comprising:

a conductive frame assembly comprising four frame members and a bottom surface, the bottom surface comprising a board connected between the four frame members;

a top surface consists essentially of a plurality of conductive ribs mounted in parallel between first and second of the frame members; and grounding wires extending from the frame assembly.

5. The conductive floor mat of claim 4, wherein the conductive ribs are mounted above the bottom surface of the conductive frame assembly to define a space therebetween.

6. The conductive floor mat of claim 5, further comprising a plurality of rigid supports disposed in parallel between the bottom surface of the conductive frame assembly and the conductive ribs for increasing the supporting capacity of the conductive ribs.

7. The conductive floor mat of claim 6, wherein the rigid supports are fixed to the conductive ribs.

8. The conductive floor mat of claim 4, further comprising a fixing button, the fixing button comprising a hole, wherein the grounding wires pass through the hole of the fixing button.

* * * * *